(12) United States Patent
Wells (10) Patent No.: US 11,757,926 B1
(45) Date of Patent: *Sep. 12, 2023

(54) SYSTEMS AND METHODS OF WEB APPLICATION SECURITY CONTROL GOVERNANCE

(71) Applicant: Wells Fargo Bank, N.A., San Francisco, CA (US)

(72) Inventor: Christopher Patrick Wells, Minneapolis, MN (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/393,056

(22) Filed: Aug. 3, 2021

Related U.S. Application Data (63) Continuation of application No. 16/831,367, filed on Mar. 26, 2020, now Pat. No. 11,108,808, which is a continuation of application No. 15/703,294, filed on Sep. 13, 2017, now Pat. No. 10,616,263.

(51) Int. Cl.
*H04L 29/06* (2006.01)
*H04L 9/40* (2022.01)

(52) U.S. Cl.
CPC ...... *H04L 63/1441* (2013.01); *H04L 63/1433* (2013.01)

(58) Field of Classification Search
CPC .................. H04L 63/1441; H04L 63/1433
USPC .......................................................... 726/25
See application file for complete search history.

(56) References Cited

U.S. PATENT DOCUMENTS

| | | | |
|---|---|---|---|
| 7,389,330 B2 | 6/2008 | Dillon et al. |
| 7,519,976 B2 | 4/2009 | Blevins |
| 8,130,952 B2 | 3/2012 | Shamoon et al. |
| 8,520,850 B2 | 8/2013 | Helms et al. |
| 8,887,154 B2 | 11/2014 | Eksten et al. |
| 8,910,295 B2 | 12/2014 | Moore |
| 8,943,599 B2 | 1/2015 | Guarnieri et al. |

(Continued)

FOREIGN PATENT DOCUMENTS

WO        03067852       8/2003

OTHER PUBLICATIONS

Mouelhi et al., Tailored Shielding and Bypass Testing of Web Applications, 2011, Fourth IEEE international Conference of Software Testing, verification and validation (Year: 2011).*

(Continued)

*Primary Examiner* — Jeffrey C Pwu
*Assistant Examiner* — Nega Woldemariam
(74) *Attorney, Agent, or Firm* — Kilpatrick Townsend & Stockton LLP (57) ABSTRACT

Security control governance can significantly thwart attacks from external data. Inline processing can reduce and limit attack surfaces and enforce validators preselected for applications. Processing and saving data can be controlled based on confirmation that an application has implemented requisite security controls to validate data. The applicability of such a technical improvement to system operations improves the technical operations of most any system with one or more applications that accept potential attack surface items, such as data, data fields, or data types, from "open" or uncontrolled sources.

16 Claims, 7 Drawing Sheets

(56) References Cited

U.S. PATENT DOCUMENTS 9,182,949 B2 11/2015 Eksten et al.
2014/0082739 A1* 3/2014 Chess .................. G06F 21/577
726/25

OTHER PUBLICATIONS

Mouelhi et al., Tailored Shielding and Bypass Testing of Web Applications, Fourth IEEE International Conference on Software Testing, Verification and Validation, Nov. 29, 2011, 10 pages.
Sadtler et al., WebSphere Application Server V7.0 Security Guide, IBM International Technical Support Organization, Available Online at: http://www.redbooks.ibm.com/redbooks/pdfs/sg247660.pdf, Jun. 2009, 578 pages.

* cited by examiner

SYSTEMS AND METHODS OF WEB APPLICATION SECURITY CONTROL GOVERNANCE

CROSS-REFERENCE TO RELATED APPLICATIONS

This application is a continuation of U.S. patent application Ser. No. 16/831,367, filed Mar. 26, 2020, and entitled "SYSTEMS AND METHODS OF WEB APPLICATION SECURITY CONTROL GOVERNANCE," which is a continuation of U.S. patent application Ser. No. 15/703,294, filed Sep. 13, 2017, and entitled "SYSTEMS AND METHODS OF WEB APPLICATION SECURITY CONTROL GOVERNANCE." The entireties of the above-noted applications are incorporated by reference herein.

BACKGROUND

In the manner that most interconnected modern computer systems operate, system controls and needs for system controls ensure that operations are and remain secure. Much effort is expended to improve actual operations of computer systems that exist in various forms of networks, with interchanges between internal secure systems and open inputs from un-validated sources from outside of those internal secure systems being a focal point. Events (attacks) may degrade system performance, and optimally, efforts are made to reduce what is known as attack surfaces of the system, such as weak links that attackers may exploit. At the crossroads of Security Information Management and Security Event Management lay a field of technical work known as SIEM. Pioneered by companies such as Forsythe, Cisco, and Gartner, methods and systems for protection of computer systems present a vigorous area of innovation as improvements in the computer systems themselves and the ability to protect against attacks remain an ongoing concern.

Web application firewalls are known in the art. However, as much as these web application firewalls may filter and help reduce attack surfaces, and help stop known vulnerabilities, they are not sufficient to provide governance of the various validators within systems and called by executing applications that themselves may be open to receiving data from clients and users from outside sources (for example, a form on a web page open to the public for the public to enter data into the form). In other words, applications may be built with validators, and it may be known what validators should have done. Still, uncertainty as to validators having done what they should have done exists. Generally, there is no governance to make sure that the validators have actually done what they should have done at or during runtime of one or more applications dealing with external and initially uncontrolled data, data fields and/or data types.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The innovation disclosed and claimed herein, in one aspect thereof, includes systems and methods that reduce attack surface item risk potential. In accordance with one aspect, a system is disclosed that includes a processor coupled to a memory that stores instructions. When the instructions are executed by the processor, the processor is caused to intercept data transmitted in response to an application request, identify a predetermined security control associated with the application based on an application profile and data requested, and identify a security control associated with the application that validated the data. The instructions further cause the processor to control access to the data for internal processing or storage based on a comparison between the security control and the predetermined security control. Access is permitted when there is a match between the security control and the predetermined security control. Further, the instructions can cause the processor to terminate further processing of the data and generate an error message when there is a mismatch between the security control and the predetermined security control. Additionally, the instructions can cause the processor to terminate further processing of the data and produce an error message when the data is unassociated with any security control. In one instance, the data is linked to a digital signature of the security control, and access control comprises digital signature comparison in which the digital signature attests to execution of the security control. In one particular instance, the system can comprise a reverse proxy to intercept the data destined for the application, and security control is specified by the application in a network header. Furthermore, the application request can comprise a webpage or form that accepts the data. Further yet, a data field is identified as a potential attack surface associated with the required security control to mitigate security concerns associated with internal processing or storage of the data input in the data According to another aspect, a method is disclosed comprising intercepting data transmitted over a network to an application, identifying a predetermined security control associated with the application and the data based on an application profile, and identifying a security control associated with the application that performs validation of the data. The method can further comprise controlling access to the data for internal processing or storage based on a result of a comparison between the security control and the predetermined security control, wherein the access is solely permitted when there is a match between the security control and the predetermined security control. Further, the method can comprise terminating processing of the data and generating an error message when there is a mismatch between the security control and the predetermined security control or when the data is unassociated with any security control. The method can further comprise receiving evidence from the application that the security control is executed with respect to a field that comprises the data. In one instance, a digital signature of the security control is received as evidence. The digital signature of the security control can be compared with the digital signature of the predetermined security control. The method can further comprise cataloging the evidence for use by an upstream application. Further, the method can comprise receiving the data entered by a user on a webpage or electronic form.

In accordance with another aspect, a method is disclosed that comprises employing a processor that executes instructions to perform operations. The operations comprise intercepting network data targeting an application with a reverse proxy, determining a predetermined security control associated with a data field comprising the data, requesting identification of a security control used to validate the data in the data field from the application, and controlling access to the data for further processing and storage based on a comparison between the security control identified by the application and the predetermined security control, wherein the access is solely permitted when the security control and the predetermined security control match. The operations further comprise terminating processing of the data and generating an error message when there is a mismatch between the security control and the predetermined security control or when no security control is identified. Further, the operations can include evaluating a digital signature associated with the security control provided as evidence against the digital signature of the predetermined security control.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. While specific characteristics are described herein, it is to be understood that the features, functions, and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
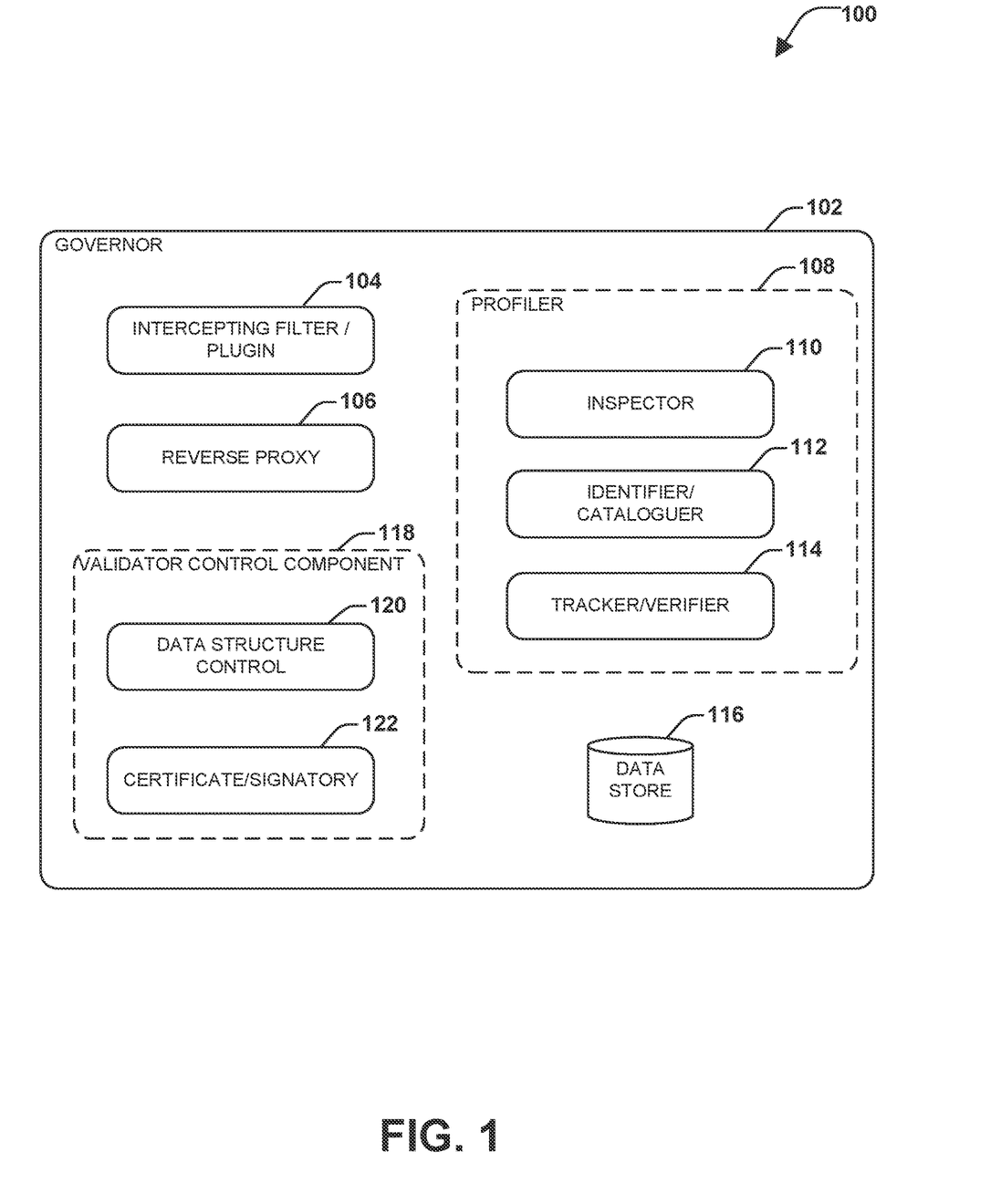
FIG. 1 is an illustration of example system components, according to one or more embodiments.

With reference now to the figures, FIG. 1 is a high-level illustration of an example system 100. In system 100, governor 102 is pictured as having a number of subcomponents. It is to be appreciated that the subcomponents may vary by embodiment, and certain subcomponents pictured with dotted lines may comprise components that may be integrated or may persist separately on their own within governor 102 or may be standalone components in communicative connection with governor 102.

It is also to be appreciated that there are many embodiments in which governor 102 may be implemented in different manners. Governor 102 in most any implementation will be in the line of action between a client/user and that client or user's computing device, which may include inputs of data, data fields and/or data types (for example, into a webpage/form), and the one or more applications (to which such a webpage/form would be associated with), as will be discussed later in regard to FIGS. 2 and 3. Further, it is to be appreciated that embodiments of governor 102 may be implemented as an intercepting filter/plug-in 104 or written as a plug-in for shell-scripting, (i.e., a reverse proxy 106). The disclosed innovation provides that the form of the governor 102 may be a singular component or may be in the form of distributed components. In an embodiment of distributed components, it is recognized that modern web servers provide plug-in functionality at multiple layers. Alternatively, governor 102 may be implemented as a reverse proxy configuration 106. For example, an implementation may be as written as a set of regular expression type codes, executing via a processing unit on a computer, for example, within ModSecurity (provided with Rules Framework) or for another example, in shell scripting language attached to a web search framework attached as a reverse proxy. The disclosed innovation is contemplated to be provided in other implementations (for example, as a dedicated hardware ASICS), although not shown. Embodiments may vary based on implementation of governor 102 between one or more applications and external facing webpage/form(s) related to one or more applications.

Aspects of this disclosure may be contrasted with firewalls, and it should be appreciated that while governor 102 may occupy a similar place as a Local Authentication Plug-in ("LAP"), an Access Policy Manager (associated with F5) or other reverse proxy protections, the actions of governor 102 as disclosed herein, distinguish from these other forms of system protection and disclose that governor 102 is different from a firewall. For example, governor 102 is aware of and controls the contents of Xheaders, can use tools to read and write Xheaders, and further organizes and uses these tools in a specific manner (through the validators control component 118 discussed later) to control the content and the meaning of the content of Xheaders, for example.

Generally, aspects of this disclosure deal with the problem of trusting data and the like from external sources that have not been validated. It is desired to run data, data fields and/or data types through some security control to reduce attack surfaces of a system. Trust problems may often be aggravated by application developers internal to a system who may lack security concerns as part of their development efforts, often focusing more on intended application functionality. Governor 102 provides a way to declare upfront expected security requirements to be followed by down-stream applications and to govern what data points and the like security would be applied to, to govern interactions after one or more applications process the prior un-validated data, data fields and/or data types and to verify and provide assurance that a valid security control was used for the particular vulnerability or requirement that is predetermined for the one or more applications' particular treatment of the data, data fields and/or data types. Governor 102 may reduce a web application's attack surface by holding web applications accountable for security controls they apply and validations they perform.

In an embodiment, governor 102 may comprise a profiler 108, which may examine profiles of one or more applications and identify basic security requirements within the one or more applications. Further, a subcomponent to profiler 108, inspector 110 may inspect the one or more applications beyond the application profile, may inspect calls an application may make for incoming data and the like, as well as may inspect most any related web pages or forms that may be generated or may be used or associated with the one or more applications. Identifier/catalogr 112 may identify and catalog downstream validators and Xheaders, for example, related to one or more applications, as well as identify and catalog upstream data, data fields and data types.

Governor 102 is not limited to being used with applications developed with profiles (for example, use with one or more applications created with no profiles is contemplated), and may be used with one or more other applications concurrently. It is to be appreciated that for applications developed without profiles, governor 102 and profiler 108 may be enabled to inspect such applications and obtain information that may typically be located within a proper application profile. Inspector 110 and identifier/catalogr 112 may interrogate data, data fields and/or data types in the one or more applications and create appropriate records that provide for alignment with appropriate validators.

Tracker/verifier 114 may also track the instances of data, data fields, and data types in each of the items that profiler 108 investigates. Records, as may be created by inspector 110, identifier/catalogr 112, and tracker/verifier 114 may be stored in data store 116. Tracker/verifier component 114 may record all incoming, untrusted, data fields presented to an application (in live-time running), and governor 102 may process down-stream applications to provide proof that those untrusted fields are properly validated by approved validators (again, in live time running), prior to allowing untrusted data ingress into other internal system components (not pictured).

While data store 116 is shown as a subcomponent of governor 102, in some embodiments, data store 116 may be a separate component within a larger system 100 and may be communicatively connected to governor 102. It is contemplated that data store 116 may also provide an active log for most any controls and rule sets stored in data store 116.

Figure 2:
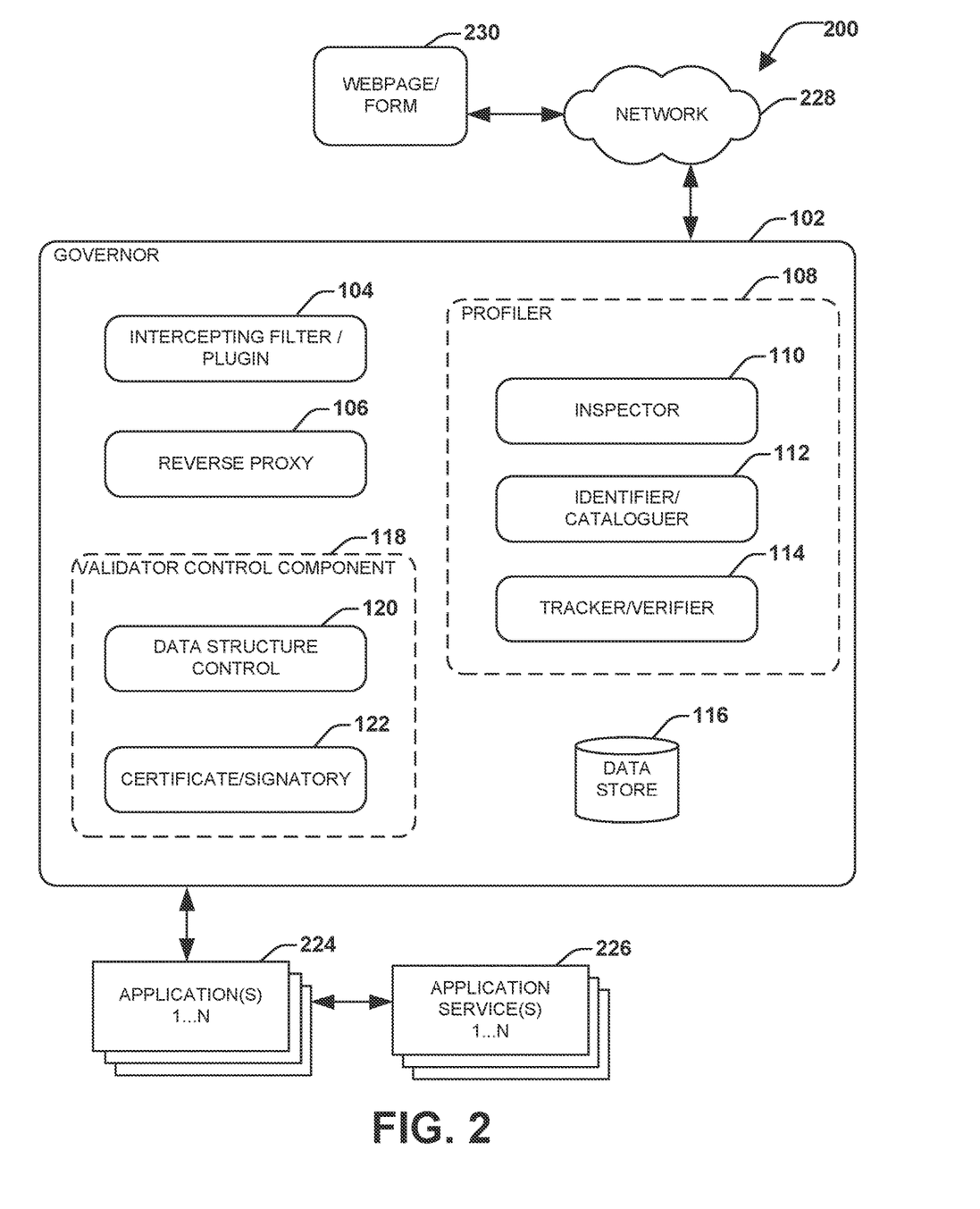
FIG. 2 is an illustration of a high-level example system in accordance with one or more aspects of the disclosure.
Figure 3:
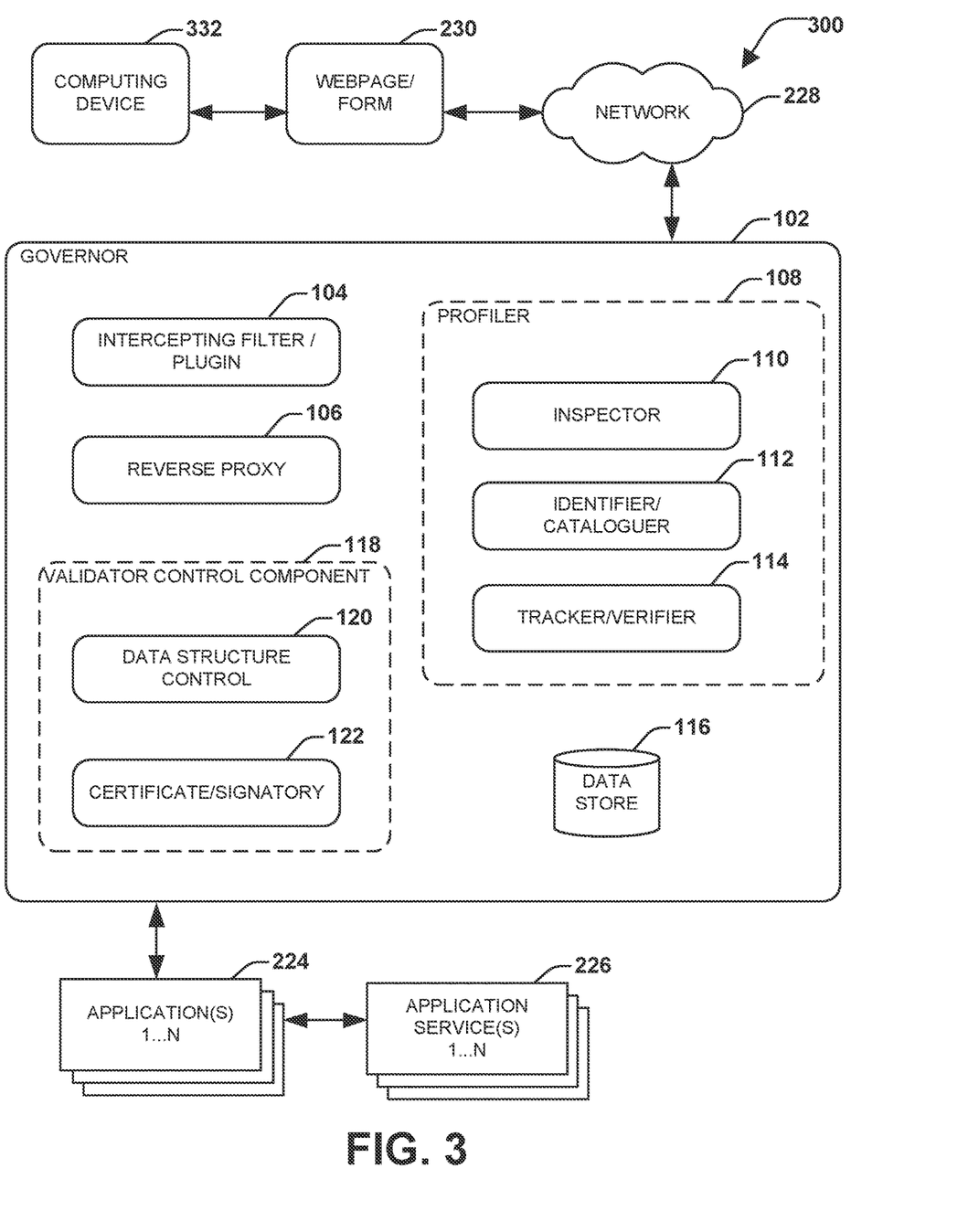
FIG. 3 is an illustration of a high-level example system in accordance with one or more aspects of the disclosure.

In an embodiment, governor 102 may perform tasks through validator control component 118. Validator control component 118 may be comprised of subcomponents data structure control 120 and certificate/signatory 122. Data structure control 120 may use existing tools, for example, ModSecurity, in order to use pathway (Xheaders) in a novel manner. It is to be appreciated that it is the manner of using pre-existing tools that is novel, as while ModSecurity may be known in the art, and known to provide tools for reviewing, reading and writing of Xheaders, the innovative aspects disclosed herein are directed to novel structuring and controlling the content of, for example, Xheaders and the use of the Xheaders across system components (for example, system 100 as shown in FIG. 1, system 200 as shown in FIG. 2 or system 300 as shown in FIG. 3).

ModSecurity does not control what is obtained and controlled in the Xheaders, but instead, aspects are controlled by governor 102. The governor 102 may create and control a convention (or control convention) to ensure that all applications and other services downstream are aligned with the governance supplied by the governor 102 through data structure control 120.

Earlier, governor 102 was contrasted with web application firewalls as a form of protection. It is to be appreciated that governor 102 is more capable than a mere firewall in that governor 102 has knowledge of firewalls that may be present (through profiler 108 and inspector 110); knowledge of all incoming request and expected data, data fields and data types (that may require validation), as well as knowledge of application configuration file data, and may programmatically (live) separately make up for application deficiencies (missing or improper validators) through validator control component 118 and may apply rules for data, data fields and data types as captured in data store 116 for dynamic application and inline use and correction.

In an embodiment, validator control component 118 may obtain proof that downstream applications and services properly performed predetermined proper validations. Data structure control 120 may create a convention for creating and treating Xheader content and may enforce the convention to ensure that Xheaders and contents of Xheaders are universally applied in a system (for example, system 100 of FIG. 1, system 200 of FIG. 2, or system 300 of FIG. 3). Data structure control 120 thus may enforce controlling protocol throughout the one or more applications and one or more application services, including validation services, as will be discussed herein and in relation to governor 102's placement in FIG. 2—that is, disposed between one or more applications and one or more webpage/form.

Certificate/signatory 122 may generate unique digital signature requests for identified validators, forward the signature requests to validators and process digitally signed fields as an attestation of those validations having been performed by the validators, and which were indicated to be performed by one or more applications; thereby ensuring that such security controls were indeed performed. Certificate/signatory 122 may interact with profiler 108 to provide internally controlled certificates to most all determined validators (of the one or more applications) for each of data, data fields, and/or data types that are introduced from outside of the internal system for the one or more applications. Profiler 108 may determine the validators per the one or more applications or in some embodiments, the validator control component 118 may augment the application listing of validators with additional validators to match the full list of data, data fields and/or data types that inspector 110 and identifier/cataloger 112 may have determined and stored in data store 116. Digital certificates may then be routed to each validator. Validators may then process digital certificates with their private keys and return a signed digital certificates back to the governor 102 through data structure control 120 (for example, through the controlled Xheader tools). Governor 102 may use identifier/cataloger 112 and tracker/verifier 114 with data store 116 and match and ensure that most all identified external and uncontrolled data, data fields, and/or data types have been validated.

In this manner, validator control component 118 verifies that most all of the data, data fields and or data types (captured by profiler 108) have been properly validated by verifying digital signatures applied by validators, processed through signatory 122, in conjunction with tracker/verifier 114 and data store 116. The disclosed innovation provides that prior to one or more applications continuing to otherwise process incoming data (and one or more applications continuing their own processing that may eventually provide the one or more application's functionality—including most any response being returned to the client/user using, for example, computing device 332 as will be discussed in relation to FIG. 3 later), governance may prevent most any "clever" applications from attempting to shortcut data, data field or data type validations, as inspector 110 of profiler 108 may catch data missing from an application profile, perhaps in an unintended attempt to bypass validator calls, and the disclosed innovation may still have governor 102 process proper validations.

In other words, governor 102 may inspect most all requests and responses made of an application through inspector 110. Governor 102 may identify and enumerate most all untrusted data through profiler 108, and may govern one or more applications to make sure that one or more applications have, and apply (or are made to apply), appropriate validators per data, data field and/or data type per application rules or per predetermined rules which may be stored in data store 116.

In another embodiment, governor 102, through profiler 108 may preserve original requests and data, data fields and/or data types, even if one or more applications treat certain data, data fields and/or data types as not being validated (if, for example, an application attempts work arounds from validation protocols). In such cases, governor 102 may determine a proper validator within the system (for example, looking up a match or rule in data store 116) and engage the validator directly. Tracker/verifier 114 keeps tracks of these separate from most any profile that may exist in one or more applications and ensure that validators (or other application services that may serve the function of controls) perform either per the one or more applications, or, if proper validator calls are missing, per rules in data store 116. This ensures proper validation and ensures that the one or more applications do not engage in shortcuts, wherein data, data fields or data types are left un-validated (and which may present an open attack surface).

In an embodiment in which one or more applications are introduced "cold," profiler 108, through inspector 110 and identifier/cataloger 112 may review application profiles that may provide a data listing, as well as review the one or more applications themselves and determine most any such items that might be missing from an application profile. Governor 102 can also be presented "cold" with one or more new applications (for example, third-party applications being integrated into an internal system that may not have been developed with a profile), and governor 102 can interrogate the one or more new applications for a number of items, as disclosed herein.

In another embodiment, Governor 102 may also augment validations if any application is not built to so have validators. That is, if the one or more applications is lacking proper validators (or calls to proper validators) for the types of data, data fields and/or data types that the application interfaces with from outside of the trusted system, governor 102 may augment the application. Even if a new application is presented directly to the Governor 102 and that new application has not been properly developed (for example, perhaps the application does not have a proper profile or perhaps has an incomplete profile), Governor 102 may still evaluate fields of the one or more applications and an associated webpage/form, may identify and catalog data fields and the like that would introduce uncontrolled (unvalidated) data and the like, and may control the provisioning of validators and certificate/signatories that serve to validate the validators to verify validation work of application services as having been completed. In this manner, governor 102 may perform with both internally developed and externally developed applications.

In other embodiments, Profiler 108 may work with tracker/verifier 114 and data store 116 in situations in which multiple applications may be interacting, and to profile, capture and apply validators present in one application to items reflected in other applications in which the data, data fields or data types are also present. Identifier/cataloger 112 may also be able to interrogate the webpage/form (for example, webpage/form 230 as will be discussed later in FIG. 2), and determine data, data fields and/or data types therein that may require validation. Tracker/verifier 114 may be aware of most items that have come in (i.e., un-validated data), and may note that most all of such may also be handled on the way out (for the one or more applications to be allowed to continue processes incoming data), In effect, governor 102 may ensure that the one or more applications have not engaged in shortcuts or misses in the validations (on the backend). This may reduce attack surfaces because data, data fields and/or data types are ensured to be validated. The disclosed innovation provides that such controls by governor 102 may reduce computational overhead within and between applications, in that tracked and verified items need not be validated multiple times if used in multiple applications. In other words, governor 102 may determine from profiler 108 that multiple applications may be involved in the interaction with a client or user (for example, through computing device 332 which will be described in more detail in relation to FIG. 3), and may "piggyback" validations from one application to another to verify that data is being validated properly.

Data structure control 120 may control structuring and content in most any variety of internal (and externally developed, but internally integrated) applications (for examples applications(s) 224) and one or more application services (for example applications service(s) 226), as well as webpage/form Xheader designations (from for example, webpage/form 230) that reflect and provide external inputs into internalized applications. It is by particular and controlled manner of controlling Xheader content and structure (for example) across most all internal applications and application services that thereby ensures that these tools are being used in a particularly structured manner in order to provide the governance and oversight of validating predetermined validators (as will be further discussed related to FIGS. 2 and 4).

In other embodiments, governor 102 may also be able to assist with provisioning of micro services. For example, a governor 102 may assist development of one or more applications to find proper validators for data fields within the one or more applications, and in those instances of development (and/or live operations), where multiple applications may be interacting, governor 102 may be able to reduce development bloat by consolidating validators to be used across multiple applications. One or more applications in group use would then have access to validations centrally controlled by governor 102.

It is contemplated that one or more applications may also use other internal services to perform validations. Governor 102 may first look to one or more applications for responsibility for providing an associative digital signature of a validation service that performs a validation (either directly or by proxy) for items related to the one or more applications, as Governor 102 maintains control of allowing the one or more applications to proceed. Governor 102 maintains "basic accounting" with data, data fields and/or data types, and if most all validations are not properly performed with proper validators, the governor 102 may hold the response, log the incident, both, or take other predetermined actions as may be captured in a rule set in data store 116.

It is to be appreciated that assigning, storing, issuing, and other actions by governor 102 may be enacted in a number of manners and a variety of implementations are possible concerning cryptographic security features (such as signing and storage and issuing of certificates). Existing certificate services or customized services may be invoked; validation of signatures may be done by a separate service or by governor 102 or its components.

As will be discussed in more detail in regard to method 400 in FIG. 4 later, validator control component 118 controls and reduces attack surfaces based on a path of uncontrolled data entering one or more applications internal to a system. Briefly, governor 102 creates a verification that existing validators have actually performed appropriate validations across all tracked "uncontrolled" data prior to an application being permitted to process and internalize data and the like. This process greatly reduces outside attack surfaces to internal systems and applications operating within internal systems that interact and obtain data from external sources.

Turning now to FIG. 2, illustrated are example system components, according to one or more embodiments 200. The innovation is now described with reference to the drawings, wherein like reference numerals are used to refer to like elements throughout. In an embodiment, Governor 102 is as described in relation to FIG. 1. Embodiment 200 illustrates one or more applications 224 interacting with governor 102, as well as one or more application services 226. Another aspect of the disclosed innovation is that governor 102 (and its subcomponents) may interface with one or more applications 224 and inspect, identify, catalog, and track instances of calls of data, data fields and data types that may be used in the one or more applications as well as one or more application services 226 in a chain fashion (as pictured) or directly (not pictured). Applications may also interact with other internal system services and resources, and governor 102 may reach through an application to other service items (for example, validation services), in processing Xheaders and issuing private certificates and private keys as well as retrieving responses from the services. FIG. 2 highlights an embodiment of a general interposition of governor 102 between a potential attack surface of data, data fields, and/or data types (through network 228) within webpage/form 230 and one or more applications 224 and associated one or more application services 226.

Embodiment 200 also illustrates governor 102 may similarly interface with a network 228 and a webpage/form 230, which may be presented through the network to external entities as will be discussed in FIG. 3. Data, data fields, and/or data types in webpage/form 230 may present a possible attack surface of unauthenticated or unverified external sources and ingress into a system. It is contemplated that one or more applications 224 may or may not be developed internally and may or may not have properly formatted profile sections. It is also contemplated that the one or more applications 224 may rely on one or more applications services 226. The one or more application services 226 may include validators. One or more applications 224 and one or more application services 226 may adhere to a validator control component 118 protocol for data structure control 120 and may interact with certificate/signatory component 122. While governor 102 may validate validators of improperly formed or developed applications, it is to be appreciated that it will be typically applications that are responsible for ensuring that each field is validated and then attesting via response to data structure control 120 (through for example Xheaders or cookies) that each data, data field and/or data type has been validated.

Embodiment 200 illustrates various interactions as governor 102 being implemented inline upstream from one or more applications that interface and obtain external data. It is to be appreciated that one or more applications 224 are a main path through which one or more application services 226 (including at least validation services) are interacted. Validation services (of the one or more application services 226) may validate identified and tracked data, data fields, and/or data types and may provide digital signatures as an attestation to performance of a validation.

As discussed with system 100 of FIG. 1, issue of private certificates from certificate/signatory 122 may travel through)(Headers (as may be set by data structure control 120), and signed certificate along with private keys may be returned from validation services of one or more application services 226 to verify governance has been successful. A listing for matching validators with desired types of data, data fields and/or data types to be validated may be stored in data store 116.

As illustrated in FIG. 2, governor 102 is interposed between one or more applications 224 and a network 228, which leads to an externally facing webpage/form 230. As discussed in FIG. 1, profiler 108 (and its subcomponents) may also be able to inspect, identify, catalog and track data, data fields and or data types across network 228 and to the webpage/form 230. Validator control component 118 may also extend the operation of its subcomponents and their control to webpage/form 230 through network 228.

Turning now to FIG. 3, illustrated are further example components according to one or more embodiments 300, specifically here is an addition of computing device 332. The innovation is now described with reference to the drawings, wherein like reference numerals are used to refer to like elements throughout. In an embodiment, Governor 102 is as described in relation to FIG. 1. Internal system components are as described in relation to FIG. 2.

As shown, computing device 332 interacts with webpage/form 230 which, over network 228, interacts with governor 102 in between one or more applications 224. It is to be appreciated that it is at computing device 332 that external and unvalidated data, data fields, and/or data types through a request through webpage/form 230 may be encountered and present an attack surface. Governor 102 may inspect, identify, catalog, track and verify webpage/form 230 as well as profiles of one or more applications 224, as well as the one or more applications 224 themselves, for potential attack surface items. Data, data files, and/or data types from external sources may be treated initially as not having been authenticated or verified. Such items may, for example present on most any interactive web page, and for another example be received from a user or client filling out information (for example, information related to a loan application). The disclosed innovation protects and ensures governance of validators that protect internal systems from potential attack surface items apart from and possibly in addition to other protection services (for example, firewalls and virus protection programs).

Another aspect of the disclosed innovation is that it may be utilized to improve development of one or more applications 224 that may have outward facing interactions (i.e., an ability to accept un-authenticated or non-verified data, data files and/or data types) may be operated either or both prior to active availability over a network 228 to a client or user computing device 332 or during live interactions with the client or user computing device 332.

System improvements available because of the disclosed innovation include providing a more robust development environment as an added governance may compensate for developers who may merely give a cursory view to security concerns, and may even view such as a hindrance to their functionality aesthetics. An aspect of the innovation is that a governor 102 may serve as a safety mechanism for internal developers who may otherwise overlook (or even attempt to evade properly compensating for) attack surface as represented by data, data fields and or data types that may be migrated into an internal system by way of applications with open faces to such unauthenticated or unverified data and the like.

Figure 4:
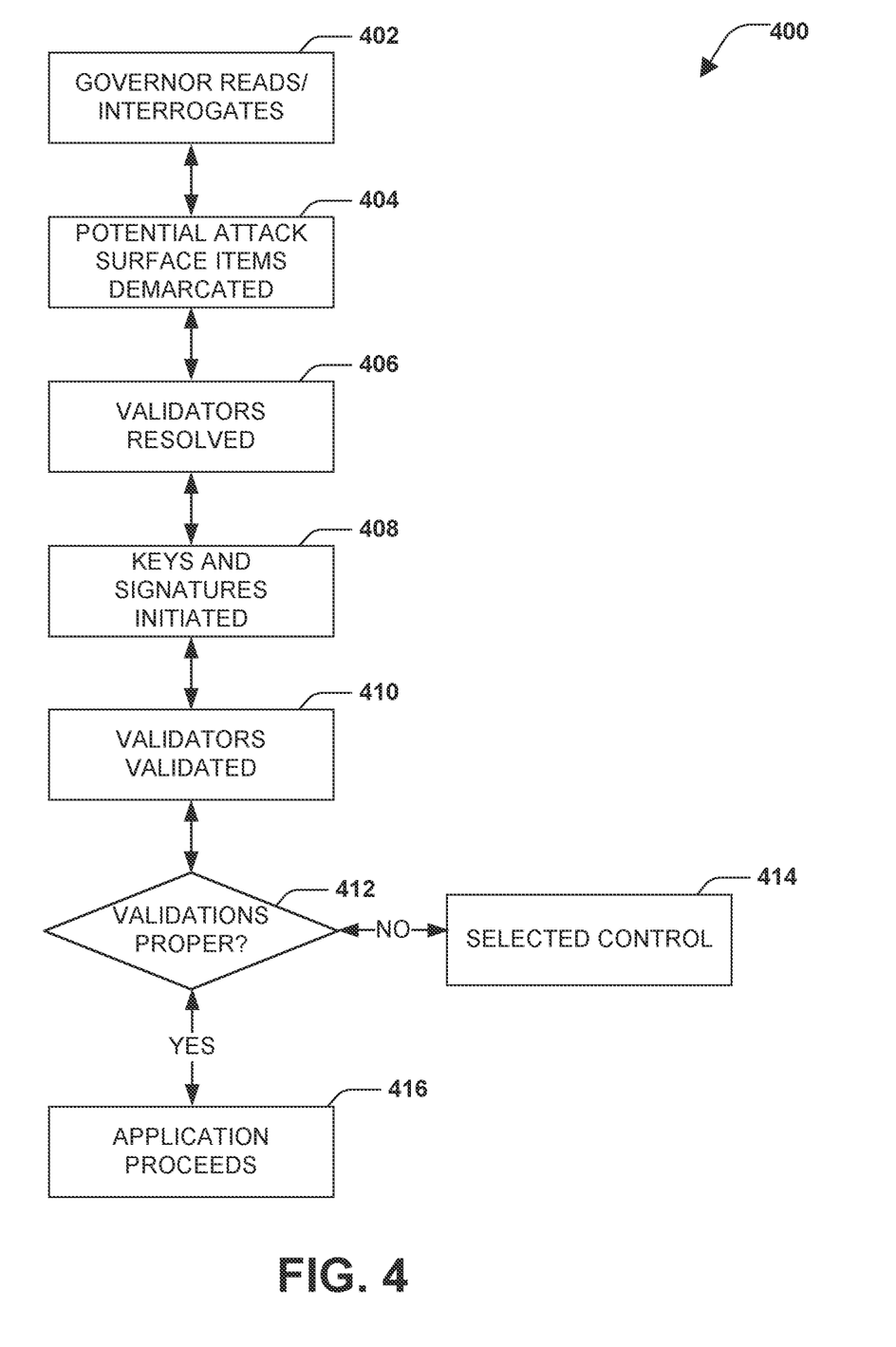
FIG. 4 is an embodiment of a method 400 of governance for application security control, according to one or more embodiments.

Turning to FIG. 4, an embodiment of a method 400 of governance for application security control, is presented according to one or more embodiments. Another aspect of the disclosed innovation is a method undergoing action in live time interaction with one or more applications and an outside user or client as may be shown in system 300 of FIG. 3. At step 402, a governor (for example governor 102) may execute and read and interrogate other system components. Execution may include enacting a profiler, for example, profiler 108, to inspect, identify, catalog and track instances of data calls, presence of data fields and/or data types both in one or more applications (for example one or more applications 224) as well as similar items in an outward facing webpage/form (for example component 230) exposed to outside users or clients through client or user computing devices (for example 332).

At step 404 data, data fields and/or data types may be demarcated and records may be created or updated, for example, records may be created or updated in data store 116. It is to be appreciated that a profiler, for example profiler 108 of system 100, may be used to demarcate potential surface attack items as determined from one or more applications, for example, one or more applications 224 as well as from webpage/form(s), for example, webpage/form 230.

At step 406, validators may be resolved. As discussed herein, resolution of validators may involve inspecting one or more application profiles, as well as determining validators for items not covered in one or more application profiles, but reflected in one or more applications themselves. As discussed herein in relation to system 100 of FIG. 1, determination of validators may involve predetermined rules which may be present in data store 116.

A governor such as governor 102 may invoke validator control component 118 and capture, through a data structure control 120, actions of certificate/signatory 122 that at step 408 initiates keys and private signature requests to the searched and controlled list of validators per step 406 and which may be stored in data store 116. In an embodiment, governor 102 may issue private certificates and upon completion, Xheaders may be signed in response (with a private key from a validator with a provided certificate). Governor 102 may have most all related validator public keys, and may use public keys, checks of Xheaders and (private key) signature verifications to govern.

At step 410 and as discussed in regard to system 100 of FIG. 1 previously, data structure control 120 and certificate/signatory 122 may control sending and receipt of attestation controls from validators attesting to the fact that indicated validations have been completed, with controls thereby enforcing validators for identified and cataloged instances as presented by webpages/form 230 and one or more applications 224.

At step 412 a governor, for example, governor 102 of system 100, would evaluate whether most all validations as may be identified and cataloged as having been properly attested by validator control component 118 in prior steps, and if the validations are determined to not be proper, then selected controls at step 414 may be enacted. It is contemplated that selected controls may vary per implementation, and may include such action as freezing action of one or more applications, requesting some secondary attestation, notifying internal and or external client user that some predetermined action may be required or some combination of these or other actions. In other embodiments, selected controls may vary according to various rules that may be captured or stored in a data store, for example data store 116 and may provide a range of control responses from provisions of warning flags for low risk items, to helpful suggestions for proper data, use of data fields or data types for errors of form, or in other embodiments, a warning and or a shutdown of an application and quarantining of data date files or data types that do not meet proper validator controls.

If validations are determined to be proper, the application proceeds at step 416. The disclosed innovation provides that logging of both achieving proper validations or not achieving proper validations may be performed and stored in a data store, for example, data store 116.

Another aspect of the disclosed innovation is that at step 416, external source data that had been previously considered un-authenticated or non-verified, may be deemed to be authenticated or verified. In some embodiments, items may be provisionally authenticated and remain tracked for data control purposes.

Figure 5:
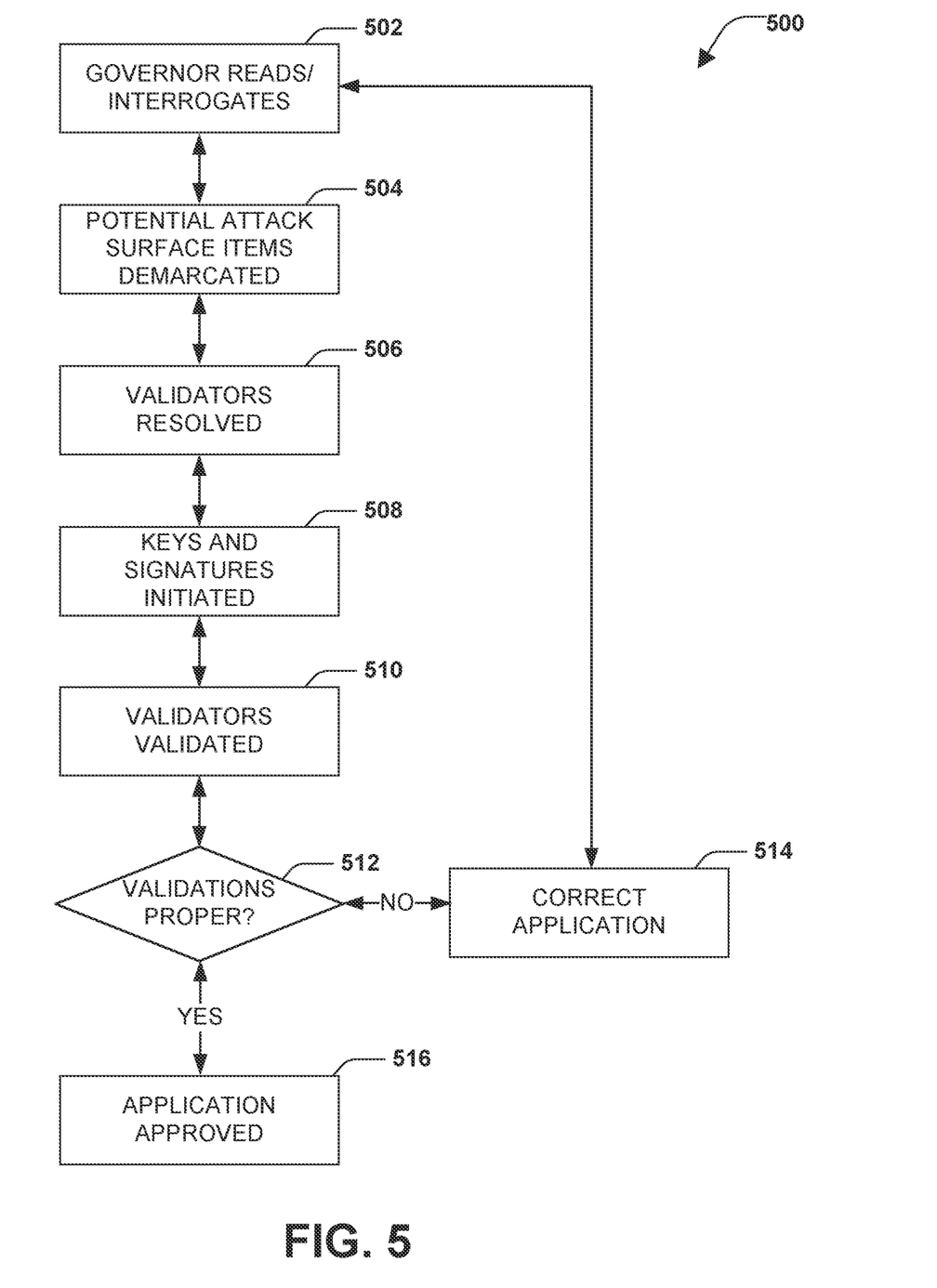
FIG. 5 discloses an embodiment of a method 500 of application development and integrating governance for application security control, according to one or more embodiments.

FIG. 5 discloses an embodiment of a method 500 of application development and integrating governance for application security control, according to one or more embodiments. The disclosed innovative method may provide governance to protect systems that employ one or more applications which may be exposed to potential attack surface items (for example, un-authenticated data, data fields, and/or data types). Method 500 may be employed in a system such as system 200 of FIG. 2 in which the system has not yet "gone live" and may be exposed to outside users or clients and their computing devices (as discussed in regards to FIG. 3). Such a method may permit more leeway for developers to focus on functionality while developing applications (or converting third-party developed applications) while also ensuring that security concerns as may be reflected by the disclosure of the innovation are still captured and integrated into a more developed application.

At step 502, a governor (e.g., governor 102) may execute and read and interrogate other system components. Execution may include enacting profiler 108 to inspect, identify, catalog, and track instances of data calls, presence of data fields and/or data types both in one or more applications (for example one or more applications 224) as well as similar items in an outward facing webpage/form (for example component 230) which is expected to be exposed to outside users or clients.

At step 504 potential attack surface items (for example, data, data fields and/or data types that may be introduced into a system from an external client/user) may be demarcated and records may be created or updated. For example, records may be created or updated in data store 116. A profiler, for example profiler 108 of system 100, may be used to demarcate potential surface attack items as determined from one or more applications, for example, one or more applications 224 as well as from webpage/form(s), for example, webpage/form 230.

At step 506, validators may be resolved. As discussed herein, resolution of validators may involve inspecting one or more application profiles, as well as determining validators for items not covered in one or more application profiles, but reflected in the one or more applications themselves. As discussed herein in relation to system 100 of FIG. 1, the determination of validators may involve predetermined rules which may be present in data store 116.

A governor such as governor 102 may invoke validator control component 118 and capture, through a data structure control 120, actions of certificate/signatory 122 that at step 508 initiates keys and private signature requests to searched and controlled list of validators per step 506 and which may be stored in data store 116. In an embodiment, governor 102 may issue private certificate and upon completion, Xheaders may be signed in response (with private key from validator with a provided certificate). Governor 102 may have most all related validator public keys, and may use public keys, checks of Xheaders and (private key) signature verifications to govern.

At step 510 and as discussed in regard to system 100 of FIG. 1 previously, data structure control 120 and certificate/signatory 122 may control sending and receipt of attestation controls from validators attesting to a fact that indicated validations have been actually completed, with controls thereby enforcing validators for identified and cataloged instances as presented by webpages/form 230 and one or more applications 224.

At step 512 a governor, for example governor 102 of system 100, would evaluate whether most all validations as may be identified and cataloged have been properly attested by validator control component 118 in prior steps and if the validations are determined to not be proper, then selected controls at step 514 may be enacted. Selected controls may vary per implementation and may include such actions as modifying applications to insert predetermined validator calls, referencing predetermined validator calls in instances in which more than one application is to be executed, and one application may "piggyback" on another application, noting to application developers that a validation issue may exist (and freezing action of such application until a developer clears a flag and amends the application to include a validation), or some combination of these or other actions. In other embodiments, selected controls may vary according to various rules that may be captured or stored in a data store, for example, data store 116, and may provide a range of control responses from provisions of warning flags for low-risk items, to helpful suggestions for proper data, use of data fields or data types for errors of form, or in other embodiments, a warning and or a shutdown of the application and quarantining of data, date files, and/or data types that do not meet proper validator controls.

If validations are determined to be proper, then the application proceeds at step 516 and is noted as compliant. Logging of remedial actions (or logging of remedial action not taken) may be performed and stored in a data store, for example, data store 116.

The disclosed innovation provides that at step 516, an expected external source data and the like that may be considered un-authenticated or non-verified, may be deemed to be sufficiently governed without requiring authentication or verification. In some embodiments, the items may be provisionally authenticated and remain tracked for data control purposes. This aspect of the disclosed innovation improves computer systems by providing a degree of robustness against potential attack surface items.

Another aspect of the disclosed innovation is that even after governor 102 has been activated (whether in development mode or in live time run mode), an ability of governor 102 and specifically, profiler 108 to inspect, identify, catalog, track, and verify may provide additional system improvements. For example, methods of applying forensics to a system, such as system 300 of FIG. 3, in which live time processing has been initiated are enabled with the disclosed innovation.

Even for approved applications or applications operating with validator control component that compensates for applications in which deficiencies may exist, external efforts to corrupt or attack systems may arise. In instances where a new weakness or vulnerability may occur, logging and enabling of traceability of a new fail point in validators and an ability to track potential attack surface items (for example, which specific data, data field, or data type may be involved in an attack), are benefits of the disclosed innovation. Attackers may find a chink that allows them to insert data and the like in a way in which a validator (for whatever reason) was not activated and newly inserted data may remain unvalidated data. A governor, such as governor 102, may then force even newly inserted data back to be properly validated, and a specific new validator may be provided to compensate for the new type of data insertion.

Figure 6:
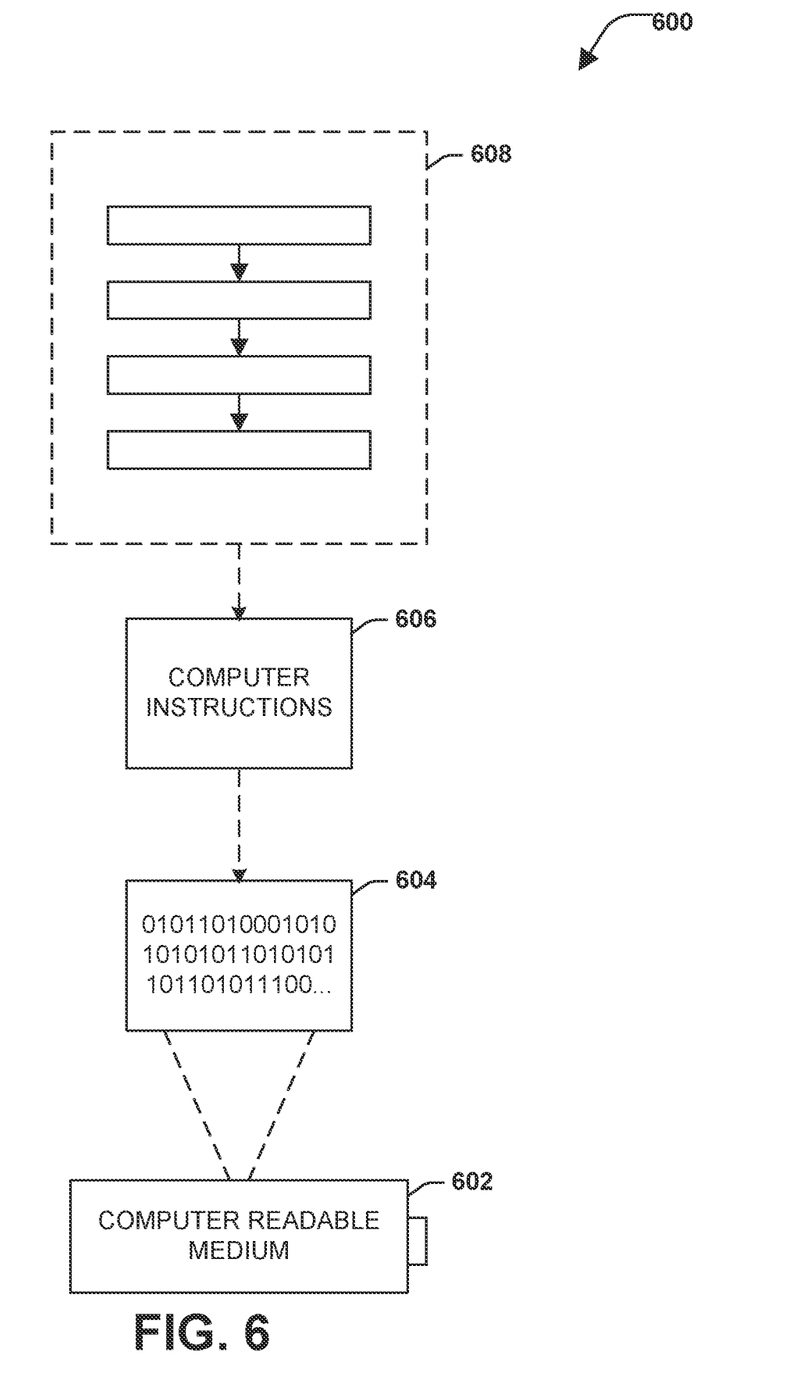
FIG. 6 is an illustration of an example computing environment where one or more of the provisions set forth herein can be implemented, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 602, such as a CD-R, DVD-R, flash drive, a platter of a hard disk drive, etc., on which is encoded computer-readable data 604. This computer-readable data 604, such as binary data including a plurality of zero's and one's as shown in 604, in turn includes a set of computer instructions 606 configured to operate according to one or more of the principles set forth herein. In one such embodiment 600, the processor-executable computer instructions 606 may be configured to perform a method 608, such as the method 400, 500 or 600 of FIG. 4, 5, or 6. In another embodiment, the processor-executable instructions 606 may be configured to implement a system, such as the system 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the scope or spirit of the claimed subject matter.

Figure 7:
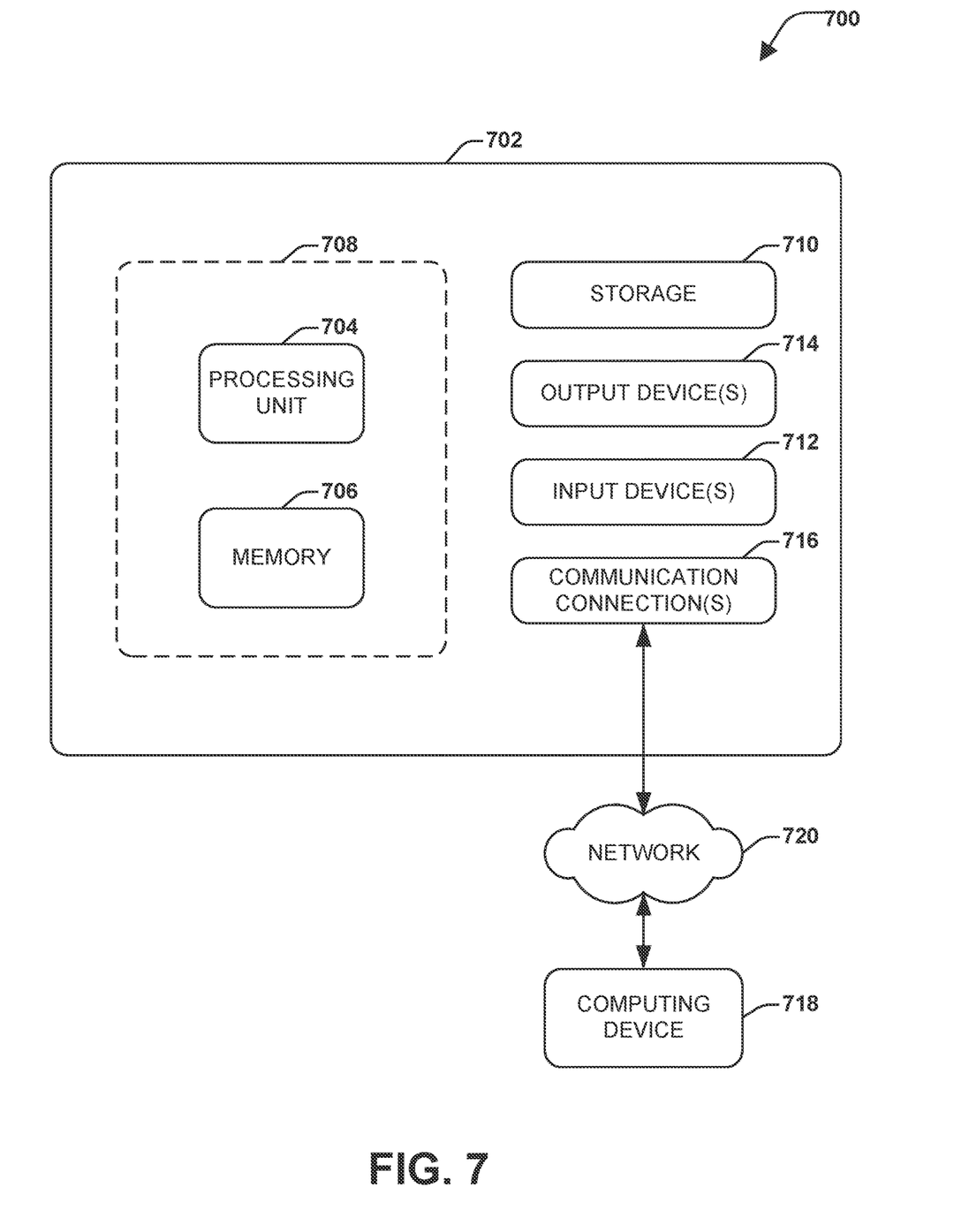
FIG. 7 is an illustration of an example computing environment where one or more of the provisions set forth herein can be implemented, according to one or more embodiments.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, minicomputers, mainframe computers, distributed computing environments that include any of the above systems or devices, etc.

Generally, embodiments are described in the general context of "computer-readable instructions" being executed by one or more computing devices. Computer-readable instructions may be distributed via computer-readable media as discussed herein. Computer-readable instructions may be implemented as program modules, such as functions, objects, Application Programming Interfaces (APIs), data structures, and the like, that perform one or more tasks or implement one or more abstract data types. Typically, the functionality of the computer-readable instructions is combined or distributed as desired in various environments.

FIG. 7 illustrates a system 700, including a computing device 702 configured to implement one or more embodiments provided herein. In one configuration, computing device 702 includes at least one processing unit 704 and memory 706. Depending on the exact configuration and type of computing device, memory 706 may be volatile, such as RAM, non-volatile, such as ROM, flash memory, etc., or a combination of the two. This configuration is illustrated in FIG. 7. 7 by dashed line 708.

In other embodiments, device 702 includes additional features or functionality. For example, device 702 may include additional storage such as removable storage or non-removable storage, including, but not limited to, magnetic storage, optical storage, etc. Such additional storage is illustrated in FIG. 7 by storage 710. In one or more embodiments, computer-readable instructions to implement one or more embodiments provided herein are in storage 710. Storage 710 may store other computer-readable instructions to implement an operating system, an application program, etc. Computer-readable instructions may be loaded in memory 706 for execution by processing unit 704, for example.

The term "computer readable media" as used herein includes computer storage media. Computer storage media includes volatile and nonvolatile, removable and non-removable media implemented in any method or technology for storage of information such as computer-readable instructions or other data. Memory 706 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information, and which may be accessed by device 702. Any such computer storage media is part of device 702.

Device 702 includes input device(s) 712 such as keyboard, mouse, pen, voice input device, touch input device, infrared cameras, video input devices, or any other input device. Output device(s) 714 such as one or more displays, speakers, printers, or any other output device may be included with device 702. Input device(s) 712 and output device(s) 714 may be connected to device 702 via a wired connection, wireless connection, or any combination thereof. In one or more embodiments, an input device or an output device from another computing device may be used as input device(s) 712 or output device(s) 714 for computing device 702. Device 702 may include communication connection(s) 716 to facilitate communications with one or more other devices 718, and such communication may occur over a network, for example, network 720.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed to imply that these operations are necessarily order-dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor coupled to a memory that stores instructions that, when executed by the processor, cause the processor to:
    intercept data transmitted in response to an application request by a first application;
    identify a predetermined security control associated with the first application based on an application profile and data requested;
    identify a security control associated with a second application that validated the data;
    control access to the data for internal processing or storage based on a comparison between the security control and the predetermined security control, wherein the access is permitted when there is a match between the security control and the predetermined security control;
    wherein the data is linked to a digital signature of the security control, and access control comprises digital signature comparison, wherein the digital signature attests to execution of the security control; and
    wherein the application request comprises a webpage or form that accepts the data.

2. The system of claim 1, wherein the instructions further cause the processor to terminate further processing of the data and generate an error message if there is a mismatch between the security control and the predetermined security control.

3. The system of claim 1, wherein the instructions further cause the processor to terminate further processing of the data and produce an error message when the data is unassociated with any security control.

4. The system of claim 1, wherein a data field is identified as a potential attack surface associated with the predetermined security control to mitigate security concerns associated with internal processing or storage of the data input in the data field.

5. The system of claim 1, further comprises a reverse proxy to intercept the data destined for the application.

6. The system of claim 1, wherein the security control is specified by the application in a network header.

7. A method, comprising:
    intercepting data transmitted over a network to an application in response to an application request;
    identifying a predetermined security control associated with the application and the data based on an application profile;
    identifying a security control associated with a second application that performs validation of the data;
    controlling access to the data for internal processing or storage based on a comparison between the security control and the predetermined security control, wherein the access is solely permitted when there is a match between the security control and the predetermined security control;
    wherein the data is linked to a digital signature of the security control, and access control comprises digital signature comparison, wherein the digital signature attests to execution of the security control; and
    herein the application request comprises a webpage or form that accepts the data.

8. The method of claim 7, further comprising terminating processing of the data and generating an error message when there is a mismatch between the security control and the predetermined security control.

9. The method of claim 7, further comprising terminating processing of the data and producing an error message when that data is unassociated with any security control.

10. The method of claim 7, further comprising receiving evidence from the application that the security control is executed with respect to a field that comprises the data.

11. The method of claim 10, further comprising cataloging the evidence for use by an upstream application.

12. The method of claim 7, further comprising receiving the data entered by a user on a webpage or electronic form.

13. A method, comprising:
    employing a processor that executes instructions to perform operations, the operations comprising: intercepting network data targeting an application with a reverse proxy in response to an application request;
    determining a predetermined security control associated with a data field comprising the data;
    requesting identification of a security control used to validate the data in the data field from the application;
    controlling access to the data for further processing and storage based on a comparison between the security control identified by the application and the predetermined security control, wherein the access is solely permitted when the security control and the predetermined security control match;
    wherein the data is linked to a digital signature of the security control, and access control comprises digital signature comparison, wherein the digital signature attests to execution of the security control; and wherein the application request comprises a webpage or form that accepts the data.

14. The method of claim 13, wherein the operations further comprise terminating processing of the data and generating an error message when there is a mismatch between the security control and the predetermined security control.

15. The method of claim 13, wherein the operations further comprise terminating processing of the data and producing an error message when no security control is identified.

16. The method of claim 13, wherein the operations further comprise evaluating the digital signature associated with the security control provided as evidence against the digital signature of the predetermined security control.

\* \* \* \* \*